(12) United States Patent
Hinckley

(10) Patent No.: US 11,499,636 B2
(45) Date of Patent: Nov. 15, 2022

(54) LUBRICATING SHAFT SEAL ASSEMBLY

(71) Applicant: Aktiebolaget SKF, Gothenburg (SE)

(72) Inventor: Mark Hinckley, Malvern, PA (US)

(73) Assignee: AKTIEBOLAGET SKF

( * ) Notice: Subject to any disclaimer, the term of this patent is extended or adjusted under 35 U.S.C. 154(b) by 184 days.

(21) Appl. No.: 16/700,347

(22) Filed: Dec. 2, 2019

(65) Prior Publication Data

US 2021/0164573 A1 Jun. 3, 2021

(51) Int. Cl.
*F16J 15/40* (2006.01)
*F16J 15/10* (2006.01)

(52) U.S. Cl.
CPC .................................. *F16J 15/10* (2013.01)

(58) Field of Classification Search
CPC ...... F16J 15/32; F16J 15/3204; F16J 15/3232; F16J 15/324; F16J 15/40
See application file for complete search history.

(56) References Cited

U.S. PATENT DOCUMENTS

| | | | |
|---|---|---|---|
| 4,277,072 A | 7/1981 | Forch | |
| 7,931,125 B2* | 4/2011 | Downes | F16J 15/3252 184/6.18 |
| 10,436,253 B2 | 10/2019 | Michael | |
| 10,962,057 B2 | 3/2021 | Kern et al. | |
| 2003/0019692 A1* | 1/2003 | Downes | F16J 15/3252 184/105.3 |
| 2005/0013020 A1* | 1/2005 | Watling | F16J 15/324 359/833 |
| 2006/0071430 A1 | 4/2006 | Downes et al. | |
| 2015/0145215 A1* | 5/2015 | Stoeck | F16J 15/3268 277/307 |
| 2015/0345639 A1* | 12/2015 | Suzuki | F16J 15/006 277/563 |
| 2022/0106984 A1 | 4/2022 | Schulz | |

OTHER PUBLICATIONS

International Search Report for corresponding International Patent Appin. No. PCT/EP20/83398 dated Feb. 8, 2021.

* cited by examiner

*Primary Examiner* — Gilbert Y Lee
(74) *Attorney, Agent, or Firm* — Reed Smith LLP

(57) ABSTRACT

A shaft seal assembly is configured for sealing, for example, a reciprocating axial-movement shaft. The shaft seal assembly includes an annular elastomeric seal body having at least one first sealing surface configured to sealing engage a shaft. A lubricant reservoir body includes a second sealing surface and comprises a polymer matrix having a porous structure containing micro-pores, wherein the micro-pores are filled with lubricating oil.

16 Claims, 3 Drawing Sheets

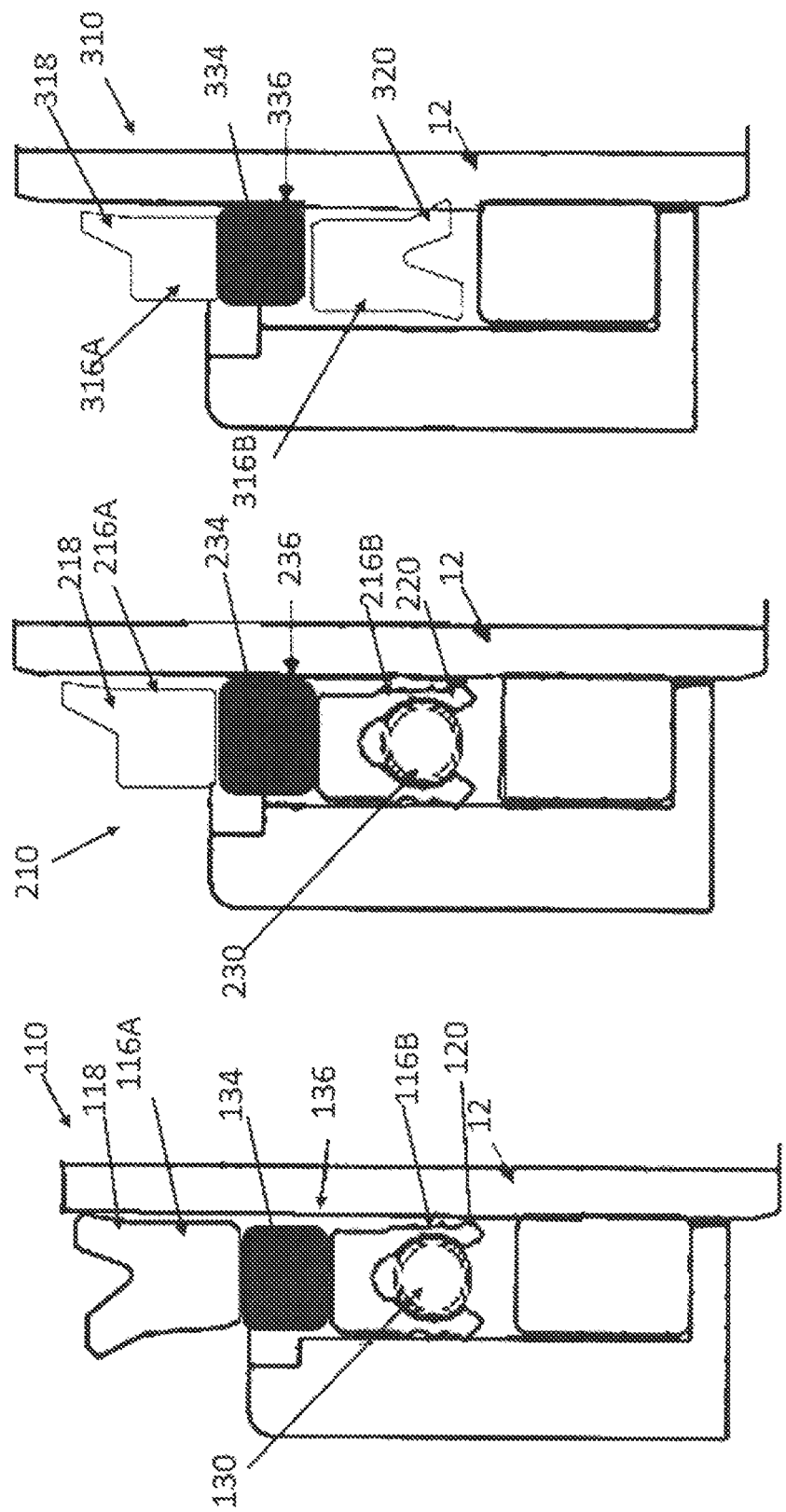

LUBRICATING SHAFT SEAL ASSEMBLY

TECHNICAL FIELD

This disclosure is generally directed to shaft seal technology, and in particular, although not exclusively, for lubricating shaft seal technology.

BACKGROUND

Shaft seals such as wiper seals are commonly used with reciprocating axial-movement shafts to seal the system from debris and contaminants. Typical shaft seals include an annular flexible seal having sealing surfaces surrounding the shaft. These sealing surfaces are typically lubricated externally with a grease or oil in order to manage wear and optimize the effectiveness of the seal. The grease used within and around the shaft seal is systematically consumed during the operation of the linear movement. As the grease coats the shaft surface and is exposed to the area outside of the wiper seal, the grease becomes filled with dirt and other contaminants. This dirt-filled grease then contacts the shaft seal and begins to accelerate the wear of the sealing surfaces causing it to be necessary to replace worn components. In some vertically oriented shaft seal assemblies, a foam ring that has been soaked in oil is placed in proximity to the wiper seal in an attempt to provide some lubrication to the sealing surface surrounding the shaft separate from the shaft seal. After some operation, these foam rings become contaminated by the dirt and other contaminants that have penetrated the seal, reducing effectiveness.

BRIEF DESCRIPTION OF THE DRAWINGS

FIGS. 3A-3C show partial cross-sectional views of shaft seal assemblies having two elastomeric seal bodies according to another example embodiments.

DETAILED DESCRIPTION

The exemplary embodiments disclosed herein are suitable in particular, although not exclusively, for the shaft seal assemblies of bicycle suspensions. Exemplary embodiments may also be used in cars or other environments having axially moving shafts. Exemplary embodiments disclosed herein reduce the drawbacks of typical shaft seal assemblies by incorporating a lubricant reservoir body, in particular a polymer matrix impregnated with a lubricant, filling in the free space between the seal lips of the shaft seal. A suitable product for forming the lubricant reservoir body is available from SKF USA INC. and/or SKF INC. of Goteborg, Sweden under the name of "Solid Oil." The lubricant reservoir body provides lubrication of the sealing surfaces without increasing the tendency to attract and retain contaminants at the sealing surface thereby improving performance and longevity of the seal and when properly molded/fitted to the application, it can act as a type of backing ring to support the seal lips from deflection under external pressure. The lubricant may be, for example, a synthetic oil and does not mechanically mix or become consumed by the lubrication process. The lubricant reservoir body replenishes the oil contained within the polymer matrix from exposure to the oil that is located within the sealed area. The lubricant reservoir body allows the shaft seal assembly to operate under extreme conditions such as temperatures as high 205° F. as and as low as −40° F. For example, the lubricant reservoir body may be operable in a bicycle or car at −20° F., 0° F., 10° F., 50° F., 100° F., or 150° F.

Purely by way of a non-limiting example, exemplary preferred embodiments incorporating concepts and techniques in accordance with this disclosure will now be described with reference to FIGS. 1-3C.

Figure 1:
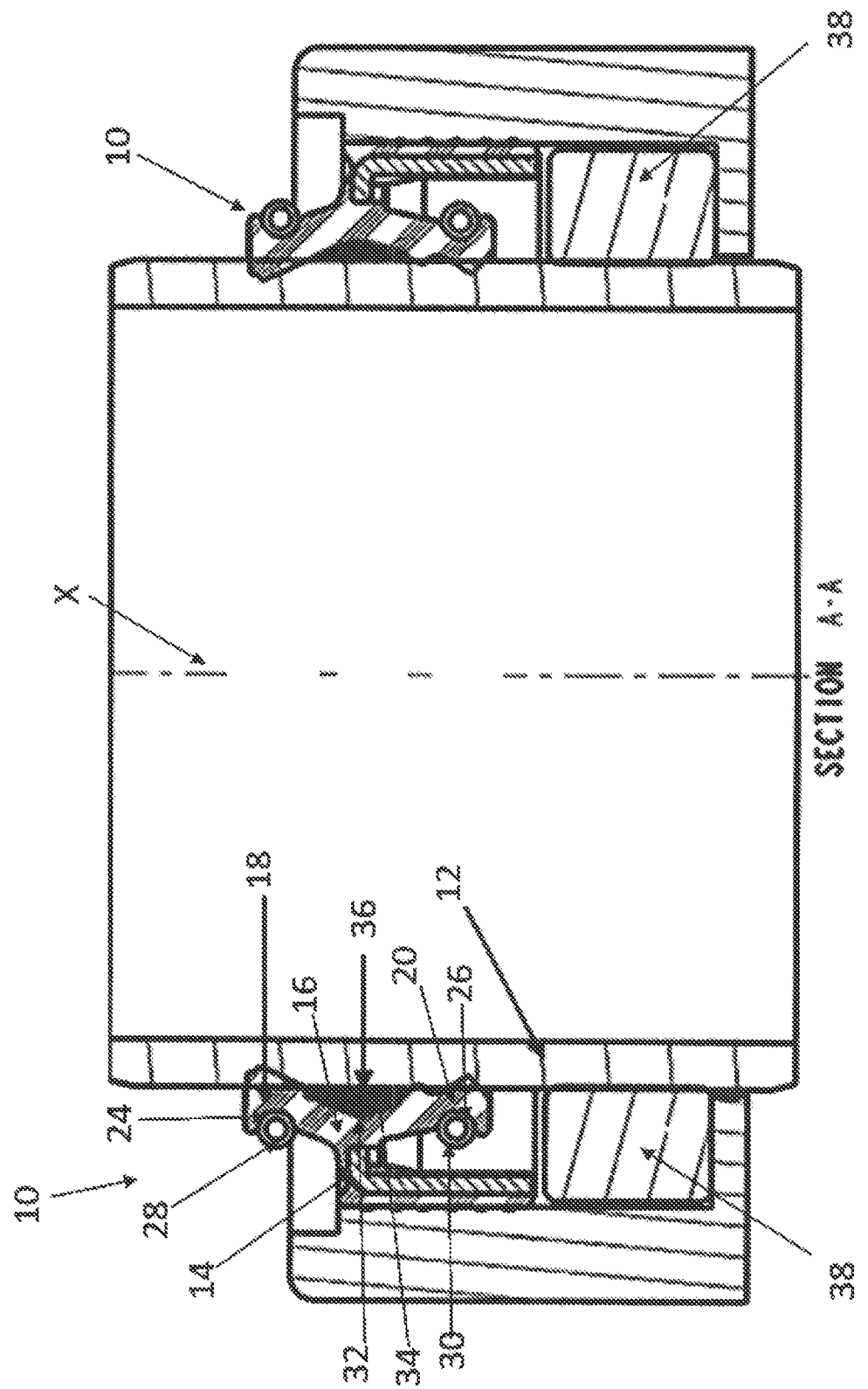
FIG. 1 is a cross-sectional view of a shaft seal assembly according to an example embodiment.
Figure 2:
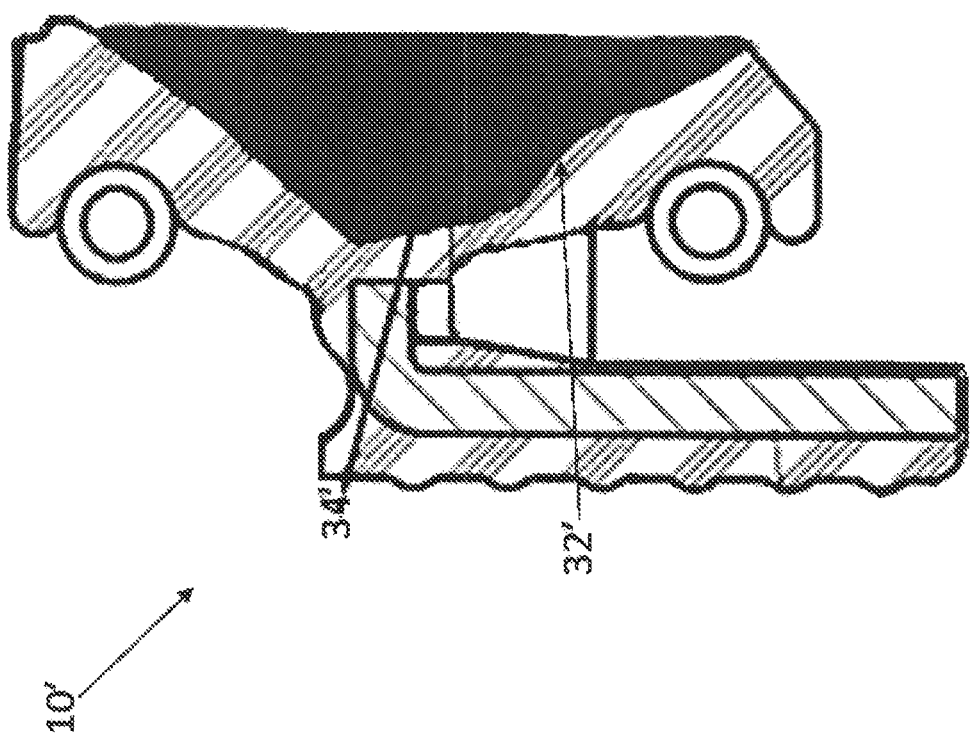
FIG. 2 is a partial cross-sectional view of a shaft seal assembly according to another example embodiment.

With reference to FIG. 1, a lubricating shaft seal assembly is denoted overall by 10. Shaft seal assembly 10 is configured for sealing, for example, a reciprocating axial-movement shaft 12. The figure shows a detail of the configuration provided by way of example.

In the whole of the present description and in the claims, the terms and expressions indicating positions and orientations such as "radial" and "axial" are understood as referring to the central axis X of shaft 12.

Shaft seal assembly 10 includes an annular retainer member 14 and an annular elastomeric seal body 16 moulded to annular retainer member 14. Annular elastomeric seal body 16 includes at least one sealing surface, for example, a first seal lip 18, an external sealing lip, and a second seal lip 20, and internal sealing lip, extending radially inwardly from upper and lower portions of annular elastomeric seal body 16 for sealingly engaging shaft 12. A first spring recess 24 and a second spring recess 26 may be provided on the radially outward surfaces of first seal lip 18 and second seal lip 20, respectively. First spring recess 24 receives a first annular loading spring 28, and second spring recess 26 receives a second annular loading spring 30 for applying pressure on first seal lip 18 and second seal lip 20 towards shaft 12. An annular space or pocket 32 is disposed axially between first seal lip 18 and second seal lip 20 on the radially inward side of annular elastomeric seal body 16. Elastomeric seal body 16 may be formed from any suitable elastomeric material such as rubber or a plastomer material. First annular loading spring 28 and second annular loading spring 30 may be, for example, rubber rings.

Shaft seal assembly 10 further includes a lubricant reservoir body 34 disposed in and filling annular pocket 32 between first seal lip 18 and second seal lip 20. Lubricant reservoir body 34 includes a shaft contacting surface 36. Lubricant reservoir body 34 is formed from a polymer matrix impregnable with a lubricating oil, which polymer matrix may comprise "Solid Oil available from SKF USA INC. and/or SKF INC. of Goteborg, Sweden." The polymer matrix has a porous structure with micro-pores throughout which hold lubricating oil due to surface tension. Such an impregnable polymer matrix may be impregnated with a lubricating oil. Lubricating oil from lubricant reservoir body 34 is released through shaft contacting surface 36 as it seeps out through the polymer matrix, wherein lubricant reservoir body 34 is configured to store and dispense lubricating oil. Lubricant reservoir body 34 is a solid piece wherein there are no open spaces and the micro-pores are too small to allow the migration of contaminants into the system. Shaft contacting surface 36 also provides an effective sealing surface with shaft 12. When shaft 12 slides against shaft contacting surface 36, it becomes coated with the lubricating oil. Then, with only a moderate increase in operating temperature, lubricating oil is pushed from the interior of lubricant reservoir body 34 to shaft contacting surface 36. This flow of lubricating oil occurs because lubricating oil has a higher coefficient of thermal expansion than a polymer matrix of a lubricant reservoir body, e.g., 34, and because viscosity of lubricating oil in accordance with this disclosure decreases with increasing temperature. When a shaft, e.g., 12, stops moving, excess lubricating oil is reabsorbed into such a polymer matrix. In this way, a lubricant reservoir body may be configured to store and dispense lubricant in order to lubricate at least one sealing surface or at least a shaft. The utilized lubricant should be compatible with oil within the shaft and may be chosen from a variety of viscosities. In some embodiments of the disclosure, a lubricating oil is a synthetic oil having an oil viscosity of 140 mm$^2$/s at 40° C. and 11 mm$^2$/s at 100° C.

Lubricant reservoir body 34 also serves as a backing ring to support first seal lip 18 and second seal lip 20 against external pressure from first loading spring 28 and second loading spring 30.

Lubricant reservoir body 34 may be molded separately from annular elastomeric seal body 16 and then machined into an appropriate shape to fit annular pocket 32. This allows existing shaft seal assemblies to be retrofitted to include a moulded lubricant reservoir body 34. Alternatively, lubricant reservoir body 34 may be machined or injection molded directly into an elastomeric seal body 16 during formation of the shaft seal assembly 10. The shape of lubricant reservoir body 34 will be predefined based on the mounted geometry of the elastomeric seal body 16. In another example embodiment of a shaft seal assembly 10' (FIG. 2), a pocket size 32' may be increased to create a larger space for a larger lubricant reservoir body 34'.

In some exemplary embodiments, a lubricant containing foam ring 38 may be provided surrounding shaft 12 in addition to lubricant reservoir body 34.

With reference to FIGS. 3A-3C, embodiments of shaft seal assemblies 110, 210, 310 are shown having features referenced with reference numerals advanced in multiples of one hundred with respect to similar features of previously described example embodiments. Each shaft seal assembly 110, 210, 310 may have two axially spaced elastomeric seal bodies 116A and 116B, 216A and 216B, 316A and 316B with a lubricant reservoir body 134, 234, 334 filling the axial space between the two axially spaced elastomeric seal bodies 116A and 116B, 216A and 216B, 316A and 316B. Each lubricant reservoir body 134, 234, 334 has a sealing surface 136, 236, 336. Each of the two axially spaced elastomeric seal bodies 116A and 116B, 216A and 216B, 316A and 316B includes at least one sealing surface or lip 118, 120, 218, 220, 318, 320. One or more of the axially spaced elastomeric seal bodies 116B, 216B may include a loading spring 130, 230.

In addition to the exemplary embodiments of this disclosure, as described above, it is to be understood that numerous further variants are possible. For example, different shaft sealing assembly configurations are possible having different seal lip, elastomeric seal body, retainer member and loading spring configurations as long as the shaft sealing assembly includes a lubricant reservoir body as discussed above, different forms of solid oil may be employed. In embodiments, a solid oil may be employed, e.g., that does not reabsorb into a polymer matrix without deviating from the scope of this disclosure.

In embodiments, a lubricant reserve body may be formed by moulding or machining, or formed in place by injection. Subsequently, a lubricant reserve body may be cured. In some embodiments, e.g., a lubricant reserve body requires curing at 350 degrees F. for about one hour. One will appreciate that other formable lubricant reserve bodies may be formed and disposed in a wiper seal body to form a sealing surface and a lubrication source for adjacently disposed elastomeric wiper seal bodies.

In embodiments, a lubricant reserve body is formed to a sealing surface by first defining a space with a seal body, e.g., a wiper seal body, forming a lubricant reserve body to completely fill a space defined within a seal body, and disposing the lubricant reserve body within the space. In embodiments, a seal surface is created by disposing a lubricant reserve body to completely fill a space defined by a seal body or by a seal body situated within a chamber. In embodiments a seal body includes two seal surfaces an inner seal surface and an outer seal surface, and a space is defined by a wiper seal body between an inner seal surface and an outer seal surface. In embodiments a wiper seal body is formed by a combination of two separate seal bodies, an inner seal body and an outer seal body. In embodiments a space within a seal body is defined by two separate seal bodies. A method of forming a shaft sealing assembling comprising forming a seal surface from a lubricant reserve body.

In some embodiments, a method of forming a shaft sealing assembly includes forming a seal surface from a lubricant reserve body. In some embodiments, a method of forming a shaft sealing assembly includes disposing the lubricant reserve body between two elastomeric seal bodies. In some embodiments, a method of forming a shaft sealing assembly includes disposing the lubricating reserve body and the two elastomeric seal bodies around a shaft. In embodiments, a method of forming a shaft sealing assembly includes disposing the lubricating reserve body and the two elastomeric seal bodies within a shaft seal assembly configured to receive a shaft, the lubricating reserve body and the two elastomeric seal bodies such that the lubricating reserve body sealingly contacts the shaft when the shaft is received into the shaft sealing assembly. In some embodiments, a method of forming a shaft sealing assembly includes two elastomeric seal bodies each include a sealing lip of a single wiper seal body, the method further including forming a lubricating reserve body to a shape that entirely fills a space formed between a single wiper seal body and a shaft received into the shaft sealing assembly.

It may also be understood that the embodiments explicitly described herein are only examples and do not limit the subject of the inventive concepts described by this disclosure and exemplified herein, nor their applications, nor all possible configurations thereof. On the contrary, although the description provided above enables the person skilled in the art to implement at least one example embodiment, it must be understood that numerous variations of the components described herein are feasible, without thereby departing from the scope of the example embodiments, as defined in the accompanying claims, interpreted literally and/or in accordance with their legal equivalents.

What is claimed is:

1. A shaft seal assembly comprising:
   at least one annular elastomeric seal body having at least one first sealing surface configured to sealing engage a shaft; and
   a lubricant reservoir body having a second sealing surface, wherein the lubricant reservoir body comprises a polymer material saturated with a lubricant, and wherein the lubricant reservoir body is configured to store and dispense the lubricant through the second sealing surface to lubricate the at least one first sealing surface and the shaft;
   wherein the at least one annular elastomeric seal body comprises a first sealing lip and a second sealing lip axially spaced from the first sealing lip, wherein each of the first sealing lip and the second sealing lip comprise the at least one first sealing surface configured to sealing engage the shaft;
wherein the lubricant reservoir body is disposed axially between the first sealing lip and the second sealing lip.

2. The shaft seal assembly of claim 1, wherein the lubricant is a lubricating oil.

3. The shaft seal assembly of claim 2, wherein the polymer material is a polymer matrix having a porous structure containing micro-pores, wherein the micro-pores are filled with the lubricating oil.

4. The shaft seal assembly of claim 3, wherein the at least one annular elastomeric seal body comprises a first annular elastomeric seal body comprising the first sealing lip and a second annular elastomeric seal body comprising the second sealing lip, wherein the second annular elastomeric seal body is spaced axially from the first annular elastomeric seal body, and wherein the lubricant reservoir body is disposed axially between the first annular elastomeric seal body and the second annular elastomeric seal body.

5. The shaft seal assembly of claim 4, wherein a space is disposed between the first annular elastomeric seal body and the second annular elastomeric seal body, and wherein the lubricant reservoir body fills the space.

6. The shaft seal assembly of claim 4, wherein the further comprising a loading spring configured for applying pressure on at least one of the first annular elastomeric seal body and the second annular elastomeric seal body towards the shaft.

7. The shaft seal assembly of claim 1, wherein the lubricant reservoir body is configured to be disposed between at least a portion of the at least one annular elastomeric seal body and the shaft.

8. The shaft seal assembly of claim 1, further comprising an annular pocket disposed between the first sealing lip and the second sealing lip on the radially inward side of the at least one annular elastomeric seal body, wherein the lubricant reservoir body is disposed within the pocket.

9. The shaft seal assembly of claim 8, wherein the first sealing lip has a first spring recess on a radial outward surface of the first sealing lip, and wherein the second sealing lip has a second spring recess on a radial outward surface of the second sealing lip.

10. The shaft seal assembly of claim 9, further comprising a first loading spring disposed in the first spring recess, and a second loading spring disposed in the second spring recess, wherein the first loading spring and the second loading spring are configured for applying pressure on the first seal lip and the second seal lip towards the shaft.

11. The shaft seal assembly of claim 10, wherein the lubricant reservoir body is configured to function as a backing ring to support the first seal lip and the second seal lip against external pressure from the first loading spring and the second loading spring.

12. The shaft seal assembly of claim 11, wherein the at least one annular elastomeric seal body is molded to an annular retainer member.

13. A method of forming a shaft sealing assembling, comprising:
forming a seal surface from a lubricant reserve body;
further including disposing the lubricant reserve body axially between two sealing lips,
wherein each of the two sealing lips sealing engages the shaft;
disposing the lubricant reserve body between two elastomeric seal bodies, wherein each of the two elastomeric seal bodies comprises one of the two sealing lips;
wherein the two elastomeric seal bodies each include one of the two sealing lips of a single wiper seal body, the method further comprising forming the lubricating reserve body to a shape that entirely fills a space formed between the single wiper seal body and a shaft received into the shaft sealing assembly.

14. The method of forming a shaft sealing assembly of claim 13, further including disposing the lubricating reserve body and the two elastomeric seal bodies around a shaft.

15. The method of forming a shaft sealing assembly of claim 13, further including disposing the lubricating reserve body and the two elastomeric seal bodies within a shaft seal assembly configured to receive a shaft, the lubricating reserve body and the two elastomeric seal bodies such that the lubricating reserve body sealingly contacts the shaft when the shaft is received into the shaft sealing assembly.

16. A shaft seal assembly comprising:
a first annular elastomeric seal body having at least one first sealing surface configured to sealing engage a shaft;
a lubricant reservoir body having a second sealing surface, and
a second annular elastomeric seal body having at least one third sealing surface configured to sealing engage the shaft, wherein the second annular elastomeric seal body is spaced axially from the first annular elastomeric seal body, and wherein the lubricant reservoir body is disposed axially between the first annular elastomeric seal body and the second annular elastomeric seal body,
wherein the lubricant reservoir body comprises a polymer material saturated with a lubricant, and wherein the lubricant reservoir body is configured to store and dispense the lubricant through the second sealing surface to lubricate the at least one first sealing surface and the shaft,
further wherein the lubricant is a lubricating oil and wherein the polymer material is a polymer matrix having a porous structure containing micro-pores filled with the lubricating oil,
further wherein a space is disposed between the first annular elastomeric seal body and the second annular elastomeric seal body, and wherein the lubricant reservoir body fills the space.

* * * * *